United States Patent
Huber et al.

(10) Patent No.: US 11,217,240 B2
(45) Date of Patent: Jan. 4, 2022

(54) CONTEXT-AWARE CONTROL FOR SMART DEVICES

(71) Applicant: SYNAPTICS INCORPORATED, San Jose, CA (US)

(72) Inventors: Jochen Huber, Zug (CH); Mohamed Sheik-Nainar, San Jose, CA (US); Anna Ostberg, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 235 days.

(21) Appl. No.: 16/377,100

(22) Filed: Apr. 5, 2019

(65) Prior Publication Data

US 2019/0311718 A1 Oct. 10, 2019

Related U.S. Application Data

(60) Provisional application No. 62/653,469, filed on Apr. 5, 2018.

(51) Int. Cl.
*G10L 15/22* (2006.01)
*H04R 3/00* (2006.01)
(Continued)

(52) U.S. Cl.
CPC .............. *G10L 15/22* (2013.01); *G06F 3/013* (2013.01); *G06F 3/0488* (2013.01); *G06F 3/167* (2013.01);
(Continued)

(58) Field of Classification Search
CPC ... G10L 15/22; G10L 2015/228; G06F 3/013; G06F 3/0488; G06F 3/167; H04R 3/00; H04R 2430/01
See application file for complete search history.

(56) References Cited

U.S. PATENT DOCUMENTS 5,255,341 A * 10/1993 Nakajima ............... B66B 1/468
340/573.1
2007/0104337 A1* 5/2007 Shurtz .................. H03G 3/3089
381/104
(Continued)

FOREIGN PATENT DOCUMENTS

JP 2002350167 12/2002
KR 1020110090158 8/2011

OTHER PUBLICATIONS

Prodanov, Plamen, "Error Handling in Multimodal Voice-Enabled Interfaces of Tour-Guide Robots Using Graphical Model", Jan. 2006, [Retrieved from Internet], [Retrieved on Jun. 14, 2019], <URL: https://www.researchgate.net/publication/37434759>, <DOI: 10.5075/epfl-thesis-3581>, 201 pages.

*Primary Examiner* — Fariba Sirjani
(74) *Attorney, Agent, or Firm* — Paradice & Li LLP (57) ABSTRACT

A voice-interaction device includes a plurality of input and output components configured to facilitate interaction between the voice-interaction device and a target user. The plurality of input and output components may include a microphone configured to sense sound and generate an audio input signal, a speaker configured to output an audio signal to the target user, and an input component configured to sense at least one non-audible interaction from the target user. A context controller monitors the plurality of input and output components and determines a current use context. A virtual assistant module facilitates voice communications between the voice-interaction device and the target user and configures one or more of the input and output components in response to the current use context. The current use context may include whisper detection, target user proximity, gaze direction tracking and other use contexts.

20 Claims, 6 Drawing Sheets

(51) Int. Cl.
 *G06F 3/16* (2006.01)
 *G06F 3/01* (2006.01)
 *G06F 3/0488* (2013.01)

(52) U.S. Cl.
 CPC .......... *H04R 3/00* (2013.01); *G10L 2015/228* (2013.01); *H04R 2430/01* (2013.01)

(56) References Cited

U.S. PATENT DOCUMENTS

| | | | |
|---|---|---|---|
| 2014/0136013 A1* | 5/2014 | Wolverton | B60K 35/00 |
| | | | 701/1 |
| 2014/0303971 A1 | 10/2014 | Yi et al. | |
| 2015/0346987 A1* | 12/2015 | Ren | G06F 16/337 |
| | | | 345/589 |
| 2015/0348548 A1 | 12/2015 | Piernot et al. | |
| 2015/0381930 A1* | 12/2015 | Quinn | H04N 7/147 |
| | | | 348/14.14 |
| 2016/0202758 A1* | 7/2016 | Peana | G09G 3/36 |
| | | | 345/601 |
| 2017/0054822 A1* | 2/2017 | Gilson | H04L 67/2842 |
| 2017/0289766 A1* | 10/2017 | Scott | H04W 4/023 |
| 2017/0358301 A1* | 12/2017 | Raitio | G10L 13/033 |
| 2018/0032300 A1* | 2/2018 | Singh | B60Q 9/00 |
| 2018/0227607 A1* | 8/2018 | Kang | H04N 21/2408 |
| 2019/0311718 A1* | 10/2019 | Huber | G06F 1/3231 |
| 2020/0114931 A1* | 4/2020 | Rao | G06K 9/00892 |
| 2020/0241824 A1* | 7/2020 | Lee | G10L 15/22 |

* cited by examiner

CONTEXT-AWARE CONTROL FOR SMART DEVICES

CROSS-REFERENCE TO RELATED APPLICATION

This application claims the benefit of and priority to U.S. Provisional Patent Application No. 62/653,469, filed Apr. 5, 2018, titled "CONTEXT-AWARE CONTROL FOR SMART DEVICES," which is hereby incorporated by reference in its entirety.

TECHNICAL FIELD

The present disclosure, in accordance with one or more embodiments, relates generally to voice-interaction devices, and more particularly for example, to intelligent voice assistant systems including multiple input and/or output modalities.

BACKGROUND

Voice-interaction devices, such as intelligent voice assistants, have gained popularity in recent years. These devices typically receive audio through one or more microphones, and then process the received audio input to detect human speech, which may include one or more trigger words and voice commands for controlling the device. Feedback is provided through to the user through a computer-generated voice output through audio speakers. The device may also include other input/output (I/O) modalities such as one or more physical buttons, lights, and a touchscreen display. Voice-interaction devices are typically optimized for voice command processing, which may not be optimal for a particular environment or user interaction. There is therefore a continued need for improved systems and methods for operating voice-interaction devices in a variety of user environments.

SUMMARY

In various embodiments of the present disclosure, an intelligent voice assistant device comprises at least one speaker, at least one microphone and audio input circuitry operable to receive audio input signals and process the audio input signals to generate target audio samples. The intelligent voice assistant device further comprises a voice processor operable to detect speech and execute associated voice commands. An input/output controller facilitates user input and output through additional I/O components which may include lights, a display, a touchscreen display, user input components such as buttons, sliders or dials, an image sensor, and other input sensing components or output devices. A context controller monitors the input components and adaptively configures the input/output modalities in response thereto. In various embodiments, the voice processor and context controller enable an artificial intelligence based virtual assistant that adapts the input and output modalities to a current use context.

In one embodiment, the intelligent voice assistant device includes at least one image sensor for acquiring images of a field of view, and the context controller analyzes the acquired images to detect and track a target user and use context. The context controller may identify a target user in an image using object or people identification image processing techniques, such as facial recognition and motion detection and tracking as known in the art. In one embodiment, the context controller evaluates whether the target user is gazing in the direction of the display of the smart device and turns the display on (if the user's gaze is directed to the display) or off (if the user's gaze is not sufficiently directed to the display). If the user's gaze is directed towards the display, the device may provide attention-aware output rendering in which the output fidelity is rendered based on the target user's distance from the system to facilitate readability from various distances. In one embodiment, the distance between the intelligent voice assistant device and the target user may be estimated through analysis of image input from a multi-sensor camera (e.g., a 3D camera).

In various embodiments, the context controller adaptively facilitates proxemic input modality selection based on an analysis of the received image(s). When the user is far from the smart device (e.g., the intelligent voice assistant device is out of the user's reach), the system may utilize voice as the main input and output modality. As the user approaches the intelligent voice assistant device, visual output through the display may become more desirable for the user. When the target user is close to the intelligent voice assistant device (e.g., within arms' reach), the interface may adaptively offer a touch-enabled interface, such as by rendering buttons on a touch screen display.

In various embodiments of the present disclosure, an intelligent voice assistant detects a user voice interaction, determines at least one voice characteristic, and modulates the output volume of the intelligent voice assistant according to the determined voice characteristic. In one embodiment, the context controller detects how loudly the user is speaking based on characteristics of the voice, which may include amplitude of the input audio signal, voicing characteristics, distance between the user and the intelligent voice assistant, environmental noise, and other characteristics. The context controller analyzes the characteristics of the input voice signal and modulates the output volume of the intelligent voice assistant to match the detected use context. For example, if the user is whispering in a quiet room, the context controller may lower the output volume to respond with a correspondingly quiet voice output. In another example, if the user is located across a room from the device, the context controller may raise the volume to project the voice output across the room to the user to clearly hear.

A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

The systems and methods of the present disclosure provide improved techniques for operating, configuring and optimizing the performance of voice-interaction devices. In various embodiments, a voice-interaction device includes a plurality of input and output modalities, which may include audio input, audio output, an image sensor, display, and/or touchscreen display. A virtual assistant module facilitates voice communications between the voice-interaction device and a target user and adapts the input and output modalities to a current use context. A context module monitors input data received from input components and updates context parameters defining the current use context. The voice-interaction device may be implemented as a voice-interaction intelligent voice assistant having a display and supporting multiple input modes including sensors for receiving voice, touch and image input.

In one embodiment, a voice-interaction device supports multiple input modalities, such as voice commands received by at least one audio sensor (e.g., a microphone) and touch input, such as sensors in a touch screen display. Certain input modalities may be better suited for performing certain tasks in a particular context than others. For example, when the voice-interaction device is out of reach of the user, voice input may be more effective and desirable than touch input. The present disclosure provides systems and methods operable to adapt the available input mode and the fidelity of the output to the detected use context and gaze of the user.

In one method of operation, when the voice-interaction device is out of reach of the user, a preferred input modality is voice and the visualization on the display screen is rendered large enough for the user to see from the detected distance. The context controller tracks the user during operation using captured images from a camera, audio input and/or other sensor input. As the user moves closer to the voice-interaction device, the visual output may be correspondingly adapted to the distance between the user and the display. As the user moves closer to the voice-interaction device, for example, more information may be displayed at a smaller size. When the user is within reach of the device, a touch-enabled interface may be provided. As the user moves away from the voice-interaction device, the displayed information may be adapted for readability with less information displayed at a larger size, and touch-enabled interfaces may be disabled (e.g., to preserve power and/or to optimize the user experience). In one embodiment, the touch-enabled input controls available when the user is close to the device may be replaced with voice prompts played through the speaker of the voice-interaction device.

During operation, voice-interaction devices often enter a low-power mode (e.g., sleep mode) while waiting for a keyword to be spoken to trigger further voice command processing. In one embodiment, the trigger and wake up functionality may be further enhanced through use of one or more built-in cameras that can detect the presence of a user in the field of view (e.g., by comparing an image frame against a background image, facial recognition, motion detection, etc.). The camera may also be used to analyze whether the user's gaze is directed towards the device (e.g., in proximity of the device and/or looking at the device) and adapt both the input and output modalities to the specific context. Captured images may be analyzed to detect human figures, which can be analyzed to determine the distance from the user to the voice-interaction device (e.g., by estimating the size of the object in the image, by determine a spatial location in a 3 dimension image captured by a 3D camera) to intelligently adapt both the input method and output fidelity to the respective context. Such detected user context information is provided to an artificial intelligence-based virtual assistant to provide the user with a better conversational experience and adapt the input method and render the visual output depending on the context and the gaze of the user.

Figure 2:
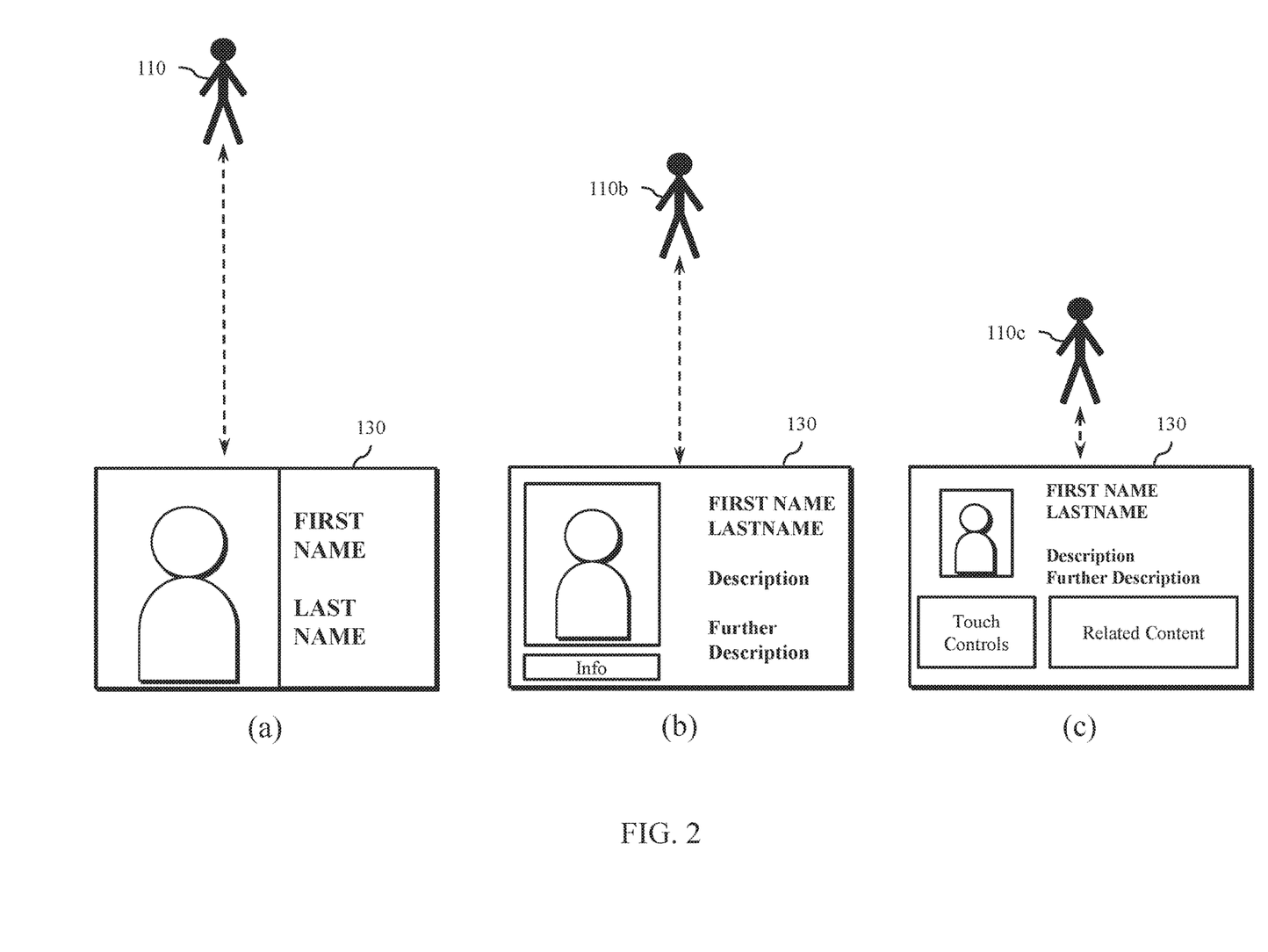
FIG. 2 illustrates example attention-aware output rendering, in accordance with one or more embodiments.

In one embodiment, attention-aware output rendering is provided. Attention-aware devices can adapt the visual interface to the attention of the user. As a first stage, the system can evaluate whether the user's gaze is directed to display and, if not, turn the display blank. If the user's gaze is directed towards the device (such that the user appears to be paying attention to the device) the system can render the output fidelity based on the distance to the system, making it more comfortable to read from afar and adding more detail as the user moves closer to the device, such as through semantic zooming. FIG. 2 illustrates three examples of potential output as a user moves closer to the display.

In another embodiment, proxemic input modality selection is provided by the context controller, which is configured to monitor one or more input components to track the target user. The device can adaptively configure an input modality based on the proximity of the user to the voice-interaction device. When the user is close to the device, such as within arms' reach, the interface can offer touch-enable interface elements (see last step in FIG. 2, where an exit button is displayed). When the user is further away from the device, such interface elements are removed for the benefit of legibility from afar, and the user interaction may be restricted to voice as the main input modality. In one embodiment, the device tracks multiple users and adapts the input modalities in the context of a multi-user environment. For example, if any user moves close to the device, the touch interface may be enabled even while other input/output modalities are configured for one or more other users.

In various embodiments, systems and methods for adaptively adjusting the voice output are also provided. In one embodiment, a voice-interaction device receives audio input signals including a target audio signal, enhances the target audio signal, determines audio characteristics associated with the target audio signal, and modulates the audio output in accordance with the determined characteristics and other available context information. The context controller may determine an appropriate output volume level for the use context, for example, by analyzing a plurality of characteristics of the user's voice and the environment which may include the speech volume in the target audio signal as measured at the device input, environmental noise (e.g., background noise level), distance between the target user and the voice-interaction device (e.g., via estimated time of arrival of speech from user, object tracking from an image sensor), voicing (e.g., whether the speech is whisper, neutral speech, shouting), and other voice characteristics. For example, if target audio signal includes whispered speech commands spoken by a user in a quiet room who is near the voice-interactive device, the context controller may lower the device output volume to deliver voice response output that approximates the input context. In another example, if the target audio signal includes shouted speech commands received in a noisy environment from a target user who is a distance away from the voice-interactive device (e.g., across a room), the context controller may adjust the device output volume to deliver voice response output at a higher level to project the voice response over the environmental noise and across the room to the target user.

The methods disclosed herein can also be applied to dynamic content such as video output. The device may track whether the user's gaze is directed towards the display. For example, one or more image sensors can be used to track the location of user, including distance from the voice-interaction device, and gaze of the user. The location and distance of the user can be determined through analysis of captured images received from a device camera (e.g., a 3D camera), and the user's gaze can be tracked, for example, by analyzing eye direction and movement. When the user is paying attention from afar, the frame rate of the video stream can be decreased, as well as the resolution of the video stream. When the user approaches the device, both rates can be incremented. This operation is beneficial for devices that operate on a battery, such as portable voice-interaction devices, phones and tablets.

The proximity, gaze tracking, modulated voice output and other functionalities disclosed herein may be implemented through system hardware such that a proximity module, gaze tracking module, voice processing module, and audio processing module can interact to detect the user presence. The user input/output space can be controlled by hardware providing I/O, context, and tracking functionality for voice, gaze, display and touch. Facial recognition can also be used to look up the history of interaction by that person to customize the user experience (e.g., make conversation easier by using accents, a particular dictionary, etc.).

Figure 1:
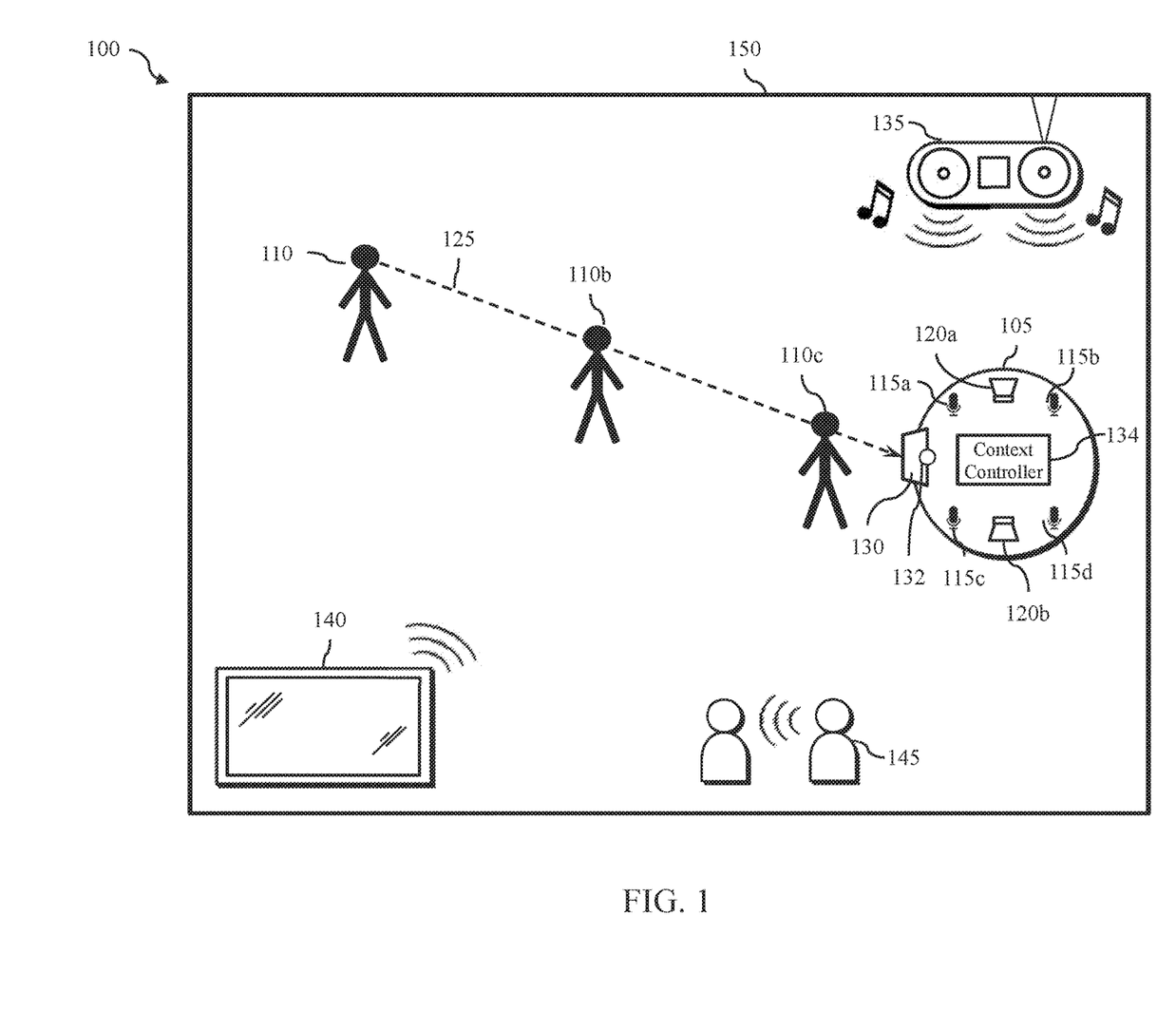
FIG. 1 illustrates an example voice-interaction device in a noisy environment, in accordance with one or more embodiments.

FIG. 1 illustrates an exemplary operating environment 100 for a voice-interaction device according to various embodiments of the disclosure. The operating environment 100 includes a voice-interaction device 105, a target audio source 110 (e.g., a user), and one or more noise sources 135, 140 and 145. In the example illustrated in FIG. 3001, the operating environment 100 is illustrated as an interior of a room 150, but it is contemplated that the operating environment may include other environments. The voice-interaction device 105 may include one or more audio sensing components (e.g., microphones) 115a-115d and one or more audio output components (e.g., speakers) 120a-120b. In the illustrated embodiment, the voice-interaction device 105 includes four microphones and two speakers, but other configurations may be implemented. The voice-interaction device 105 also includes at least one user input/output component 130, such as a touch screen display and an image sensor 132, providing additional mode(s) of user interaction with the voice-interaction device 105.

The voice-interaction device 105 is operable to sense sound from the environment, via the audio sensing components 115a-115d, and generate an audio input signal, which may comprise two or more audio input channels. The voice-interaction device 105 may process the audio input signal using audio processing techniques to detect and enhance an audio signal received from the target audio source 110. For example, a spatial filter (e.g., beamformer) may receive the audio input signal, identify the direction of the target signal, and using constructive interference and noise cancellation techniques, output an enhanced audio signal (also referred to as an enhanced target signal) that enhances the sound (e.g., speech) produced by the target audio source 110. The enhanced audio signal may then be transmitted to other components within the voice-interaction device 105, such as a speech recognition engine or voice command processor, or as an input signal to a Voice-over-IP (VoIP) application during a VoIP call. In various embodiments, the voice-interaction device 105 may operate as a communications device facilitating VoIP communications or video conferencing across a network, and the voice-interaction device may also receive audio and video signals from a remote device and output the audio signals via the audio output components 120a-120b.

The target audio source 110 may be any source that produces target audio 125 detectable by the voice-interaction device 105. In the illustrated example, the target audio 125 is defined as human speech, and the target audio source 110 is a human. In addition to target audio source 110, the operating environment 100 may include one or more noise sources 135-145. In various embodiments, sound that is not target audio is processed as noise. In the illustrated example, the noise sources 135-145 may include, for example, a loud speaker 135 playing music, a television 140 playing a television show, movie or sporting event, and background conversations between non-target speakers 145. It will be appreciated that other noise sources may be present in various operating environments.

The target audio and noise may reach the microphones 115a-115d of the voice-interaction device 105 from different directions, and the location of each audio source may change over time. For example, the noise sources 135-145 may produce noise at different locations within the room 150, and the target audio source (person) 110 may speak while walking around the room 150. Furthermore, the target audio and/or the noise may reflect off fixtures (e.g., walls) within the room 150. The voice-interaction device 105 may estimate a location of the target audio source 110 based on the audio input signals received by the microphones 115a-115d and process the audio input signals to enhance the target audio and suppress noise based on the estimated location. Information relating to the direction of the target audio source 110 and distance away from the voice-interaction device 105 may be provided to the context controller 134, which monitors the user location and activity and adaptively configures the operation of the voice-interaction device 105 in accordance with a current context of use.

In one embodiment, the voice-interaction device 105 further includes one or more image sensors 132, such as may be implemented in a 3D camera. In operation, the image sensor 132 and touchscreen display 130 may provide video calling functionality, video recording and image capture functions. The image sensor 132 may also be used to identify the location of the target audio source 110, whether the target source's gaze is directed to the voice-interaction device 105, and other information about the environment 100 and target audio source 110. In one embodiment, the context controller 134 is operable to monitor audio and visual context information and adaptively configure the voice-interaction device 105 in response thereto.

In one embodiment, the target audio source 110 (also referred to herein as the target user) may initially be located far away from the voice-interaction device 105. The context controller 134 can estimate the location of the target audio source 110 using audio and visual information received from the microphones and image sensor 132. When the user is far away and out of reach of the voice-interaction device, for example, touch controls are not effective and detailed information on the touchscreen display 130 may not be readable. The context controller 134 may turn off the touchscreen display 130 if the user is too far from the voice-interaction device to read the display or if the user is not paying attention to the touchscreen display screen 130 as determined by tracking the user's gaze. In this manner, the voice-interaction device 105 can save power and the context controller 134 can adjust the output modality to enhance the user experience (e.g., by alternatively preparing and directing output to the audio output components 120*a*-*b*).

In various embodiments, the context controller 134 may monitor the location and gaze of the target audio source 110 and modify the modalities according to a current context. For example, if the user is located across the room, the touchscreen display 130 may be used to display a reduced amount of information at a larger size which may be viewable across the room (such as depicted in screen (a) of FIG. 2). As the user moves closer to the voice-interaction device 105 (such as to position 110*b*) the user can better see the display, allowing more visual output to be displayed (such as illustrated in screen (b) of FIG. 2). As the user moves closer and within reach of the voice-interaction device 105, such as to position 110*c*, the user may be able to read additional detailed content displayed on the screen and is close enough to activate touch controls (such as presented on screen (c) of FIG. 2).

In another embodiment, the voice-interaction device 105 is operable to monitor a noise level of the environment and adjust the output volume for voice prompts in view of environmental noise conditions. When noise levels are above a certain threshold, the context controller 134 may switch the output prompts to a visual representation on the touchscreen display.

Figure 3:
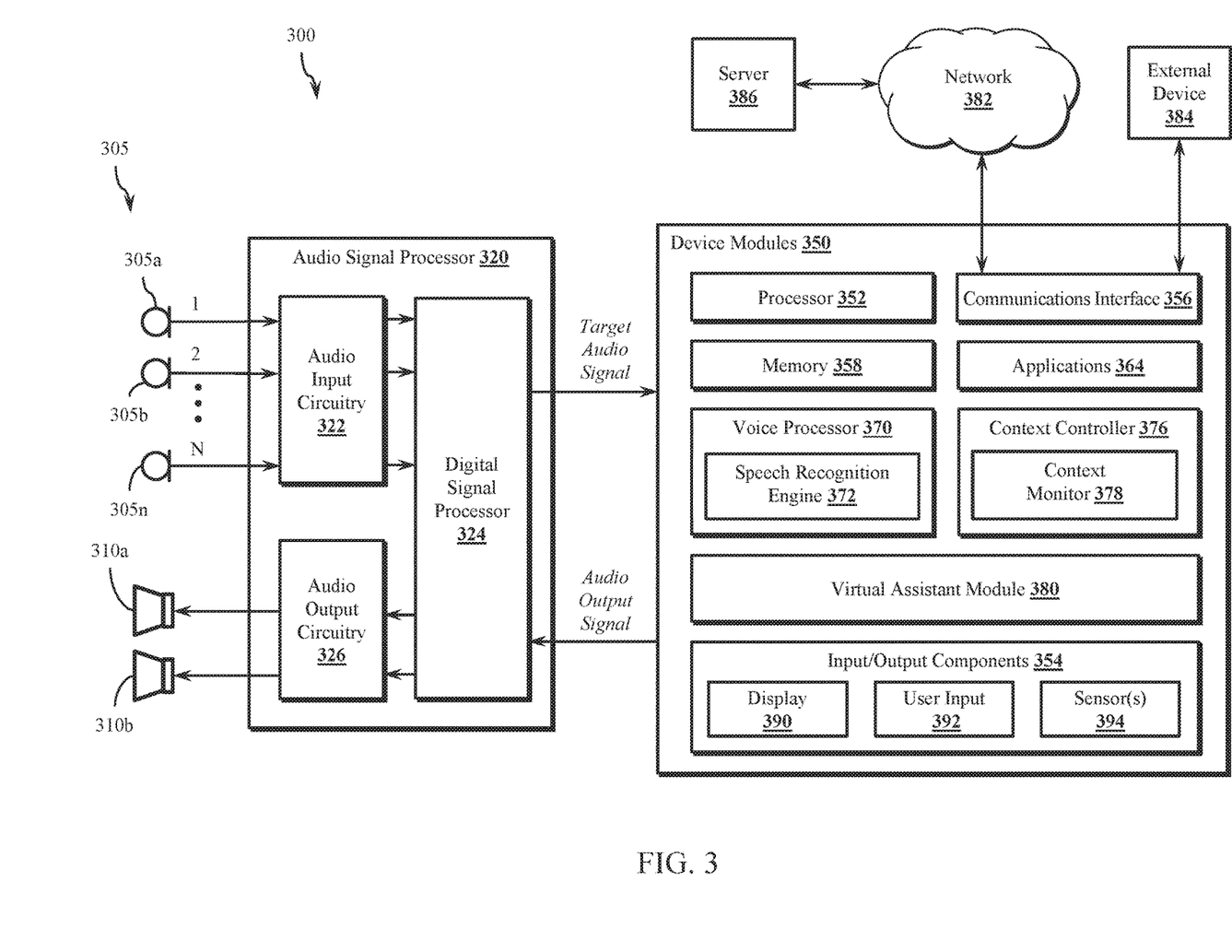
FIG. 3 illustrates an example context-aware voice-interaction device, in accordance with one or more embodiments.

FIG. 3 illustrates an exemplary device 300 according to various embodiments of the disclosure. In some embodiments, the device 300 may be implemented as the voice-interaction device 105 of FIG. 1. The device 300 includes an audio sensor array 305, at least one speaker 310*a*-*b*, an audio signal processor 320 and device modules 350.

The audio sensor array 305 comprises two or more sensors, each of which may be implemented as a transducer that converts audio inputs in the form of sound waves into an audio signal. In the illustrated environment, the audio sensor array 305 comprises a plurality of microphones 305*a*-305*n*, each generating an audio input signal which is provided to the audio input circuitry 322 of the audio signal processor 320. In one embodiment, the audio sensor array 305 generates a multichannel audio signal, with each channel corresponding to an audio input signal from one of the microphones 305*a*-*n*.

The audio signal processor 320 includes the audio input circuitry 322, a digital signal processor 324 and audio output circuitry 326. In various embodiments the audio signal processor 320 may be implemented as an integrated circuit comprising analog circuitry, digital circuitry and the digital signal processor 324, which is operable to execute program instructions stored in firmware. The audio input circuitry 322, for example, may include an interface to the audio sensor array 305, anti-aliasing filters, analog-to-digital converter circuitry, echo cancellation circuitry, and other audio processing circuitry and components as disclosed herein. The digital signal processor 324 is operable to process a multichannel digital audio signal to generate an enhanced target audio signal, which is output to one or more of the device modules 350. In various embodiments, the digital signal processor 324 may be operable to perform echo cancellation, noise cancellation, target signal enhancement, post-filtering, and other audio signal processing functions. In some embodiments, the device modules 350 are configured to enter a low power mode (e.g., a sleep mode) during periods of inactivity, and the audio signal processor 320 is operable to listen for a trigger word and wake up one or more of the device modules 350 when the trigger word is detected.

The audio output circuitry 326 processes audio signals received from the digital signal processor 324 for output to at least one speaker, such as speakers 310*a* and 310*b*. In various embodiments, the audio output circuitry 326 may include a digital-to-analog converter that converts one or more digital audio signals to analog and one or more amplifiers for driving the speakers 310*a*-310*b*.

The device 300 may be implemented as any voice-interaction system or apparatus such as, for example, an intelligent voice assistant, a mobile phone, tablet, laptop computer, desktop computer, voice-interaction appliance, or automobile. The device modules 350 may comprise various hardware and software components for facilitating the operation of the device 300. In the illustrated embodiment, the device modules 350 include a processor 352, user interface components 354, a communications interface 356 for communicating with external devices and networks, such as network 382 (e.g., the Internet, the cloud, a local area network, or a cellular network) and external device 384 (e.g., a mobile device), and a memory 358. The device 300 may further include one or more applications 364, a voice processor 370, a context controller 376, and a virtual assistant module 380.

The processor 352 and digital signal processor 324 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The device modules 350 are configured to interface and communicate with the audio signal processor 320 and the other device modules 350, such as through a bus or other electronic communications interface.

It will be appreciated that although the audio signal processor 320 and the device modules 350 are shown as incorporating a combination of hardware components, circuitry and software, in some embodiments, at least some or all of the functionalities that the hardware components and circuitries are operable to perform may be implemented as software modules being executed by the processor 352 and/or digital signal processor 324 in response to software instructions and/or configuration data, stored in the memory 358 or firmware of the digital signal processor 324.

The memory 358 and other memory components disclosed herein may be implemented as one or more memory devices operable to store data and information, including audio data and program instructions. Memory 358 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 352 may be operable to execute software instructions stored in the memory 358 and other memory components. In various embodiments, voice processor 370 may be implemented in hardware, software instructions executed by processor 352 or a combination of hardware and software. Voice processor 370 includes a speech recognition engine 372 operable to process the target audio signal received from the audio signal processor 320 to identify speech and detect trigger words and/or voice commands.

The user interface components 354 may include a display 390, user input components 392, such as touchpad display, a keypad, one or more buttons, dials or knobs, and/or other input/output components operable to enable a user to directly interact with the device 300. The user interface components 354 may also include one or more sensors such as one or more image sensors (e.g., a camera) for capturing images and video. In some embodiments, the user interface components 354 include at least one input component for receiving a non-audible target user interaction, and/or at least one output component for generating a non-audible response to the target user.

The device module 350 further includes a context controller 376, which may be implemented in hardware, software instruction executed by processor 352, or a combination of hardware and software. The context controller 376 includes a context monitor 378 for receiving, processing and monitoring a current environmental and use context of the device 300, which may include monitoring one or more non-audible target user interactions. For example, the context controller 376 may be configured to detect a location and movement of a target user and determine whether the target user is paying attention to the device 300 by tracking the user's gaze (e.g., by determining the gaze direction from a captured image of the target user).

In one embodiment, the context controller 376 is operable to process video images from a 3D image sensor (sensor 394), detect the present of a target human within the field of view, track the movement of a target person and determine how far away the target person is from the device 300 (e.g., by analyzing the relative size or position of the human detected in the image). In one embodiment, the context monitor 378 is operable to analyze images received from the image sensors 394 to determine whether the target human is paying attention to the device 300, for example, by tracking eye movement. Context information may be stored in a memory as context parameters for access by other modules.

The virtual assistant module 380 is operable to provide a conversational experience to the target user, adapt the input/output modalities and facilitate the execution of user commands (e.g., voice commands received from the target user). In various embodiments, the virtual assistant module comprises an artificial intelligence-based system (e.g., an artificial intelligence module) including a trained neural network that receives voice commands from the voice processor 370 and context parameters from the context controller 376 and adapts the user experience to a current use context as disclosed herein. Applications 364 include instructions which may be executed by processor 352 and associated data and may include device and user applications that may be initiated by the user and/or virtual assistant module 380. In one embodiment, the applications 364 include a VoIP application facilitating voice communications with one or more external devices such as an external device 384 or a server 386. In various embodiments, the virtual assistant module 380 is operable to adaptively update the input and output modalities in accordance with context information from the context controller 376.

The communications interface 356 facilitates communication between the device 300 and external devices. For example, the communications interface 356 may enable Wi-Fi (e.g., 802.11) or Bluetooth connections between the device 300 and one or more local devices, such external device 384, or a wireless router providing network access to a server 386, such as through the network 382. In various embodiments, the communications interface 356 may include other wired and wireless communications components facilitating direct or indirect communications between the device 300 and one or more other devices.

Figure 4:
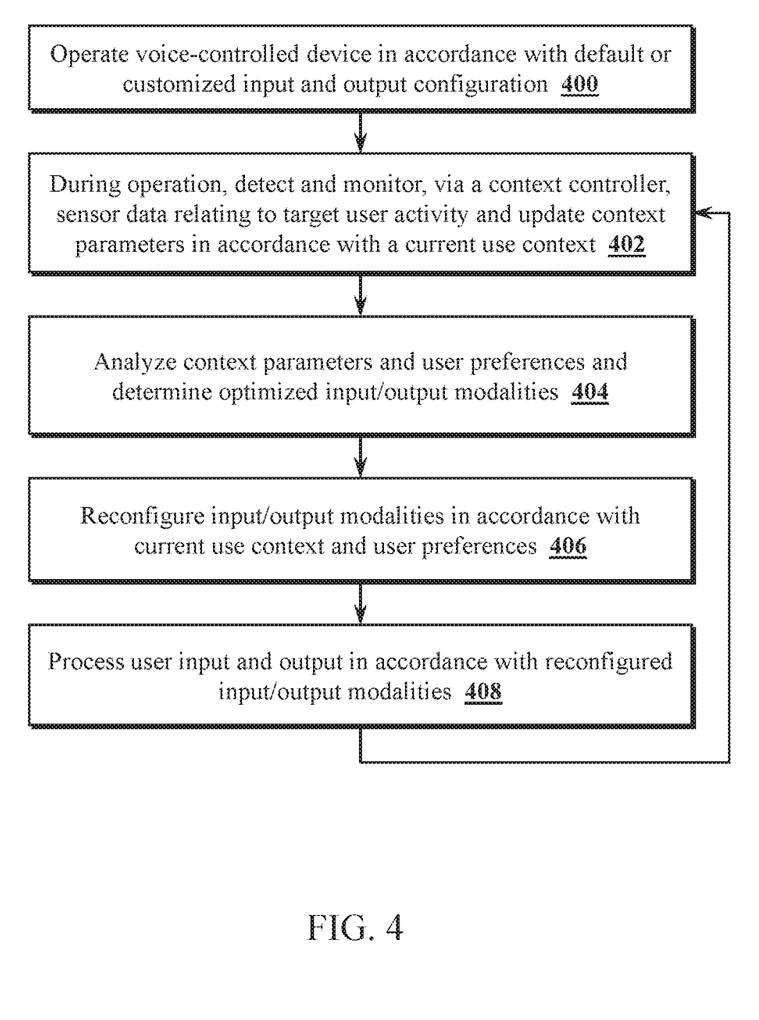
FIG. 4 is a flow chart illustrating an example operation of a context aware controller, in accordance with one or more embodiments.

Referring to FIG. 4, an operation of a context-aware voice-interaction device in accordance with an embodiment of the present disclosure will now be described. A voice-interaction device is initially operated in accordance with a default input/output configuration, as configured by a user (step 400). During operation, a context controller detects and monitors audio and sensor data relating to target user activity (step 402). The audio data may indicate the presence and location of a target user and level of noise in the environment. The other sensor data may include an image sensor and image processing functionality for detecting and tracking objects in the field of view of the image sensor. For example, the distance and location of the target user with respect to the device may be used to set an output configuration for a display screen. The location of the target user may be determined, for example, by image analysis of the size and location of a detected target user in the field of view of an image sensor. The position may also be estimated, for example, by analyzing the direction of target audio received by a device microphone array. The estimated distance and location of the target user may be stored as context parameters defining a current context. In various embodiments, context parameters may include numerical data (e.g., number of target users detected, distance in meters from the device, direction of target user relative to the display in degrees), state information (e.g., whether target user is within reach of the device, whether the display is readable from the position of the target user, whether the target user's gaze is directed towards the device), and other context information in accordance with system requirements.

The context parameters are analyzed in view of user preferences to determine optimized input/output modalities (step 404), and the device input/output configuration is updated in accordance with a current use context (step 406). For example, a target user may be in a first location that is too far away or at a viewing angle such that information displayed on a display device cannot be viewed. The display device may be shut off (e.g., to save power) and other output modalities may be used for user output (e.g., delivery of audio information and prompts through device speakers). The target user may move to a second location which is out of reach of the device, but close enough to view basic information provided on the display device. As the target user approaches the device, the context parameters will be updated to show the new target user location and the output configuration may be adaptively configured to provide the target user with more detailed information, readable from the new closer distance.

In various embodiments, while the device is outside the reach of the target user, the device input and output may be configured for voice command processing with audio prompts. The target user may move to a third location which is within the reach of the device (e.g., by comparing a current distance to a reach threshold value), allowing for touch controls which may be preferred over voice processing. Active applications adaptively process input and output in accordance with the changing device input/output configuration (step 408), and the device continues operation in accordance with the new context configuration (e.g., to direct input and output interactions through desired modalities).

Figure 5:
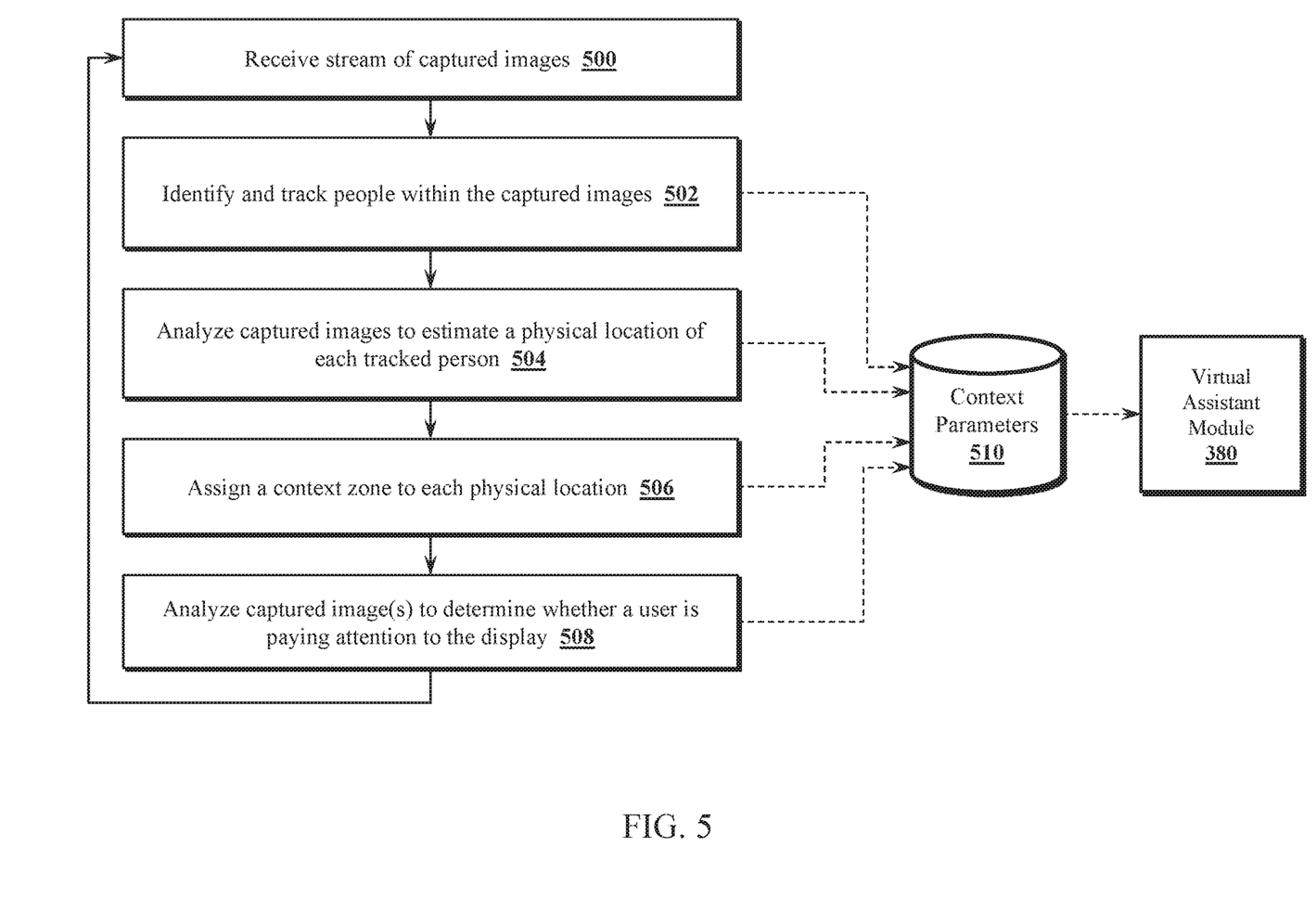
FIG. 5 is a flow chart illustrating an example operation of a context aware voice-interaction device, in accordance with one or more embodiments.

Referring to FIG. 5, an example operation of a context aware voice-interaction device, in accordance with one or more embodiments, will now be described. In step 500, the context controller receives a stream of captured images from one or more image sensors, such as a 3D camera of the voice-interaction device. The context controller analyzes the images to identify and track humans within the captured images (step 502). Next, the physical location of each tracked human relative to the device is estimated (step 504). Based on the physical location and estimated distance from the device to the human, a context zone may be assigned (step 506), such as zones identifying whether the tracked person is within reach of the voice-interaction device, a zone where the device is out of reach and the display is readable, a far zone where the device is out of reach and readability of the display is limited, and a zone indicating the display cannot be viewed by the tracked person (e.g., the person is too far away or at a location without a line-of-sight to the display). In step 508, the image is further analyzed to determine whether the tracked person is paying attention to the display (e.g., by determining a point of gaze and eye movement). The parameters are stored in a context parameters memory 510 which may be accessed by other system components, such as the virtual assistant module 380 of FIG. 3.

Figure 6:
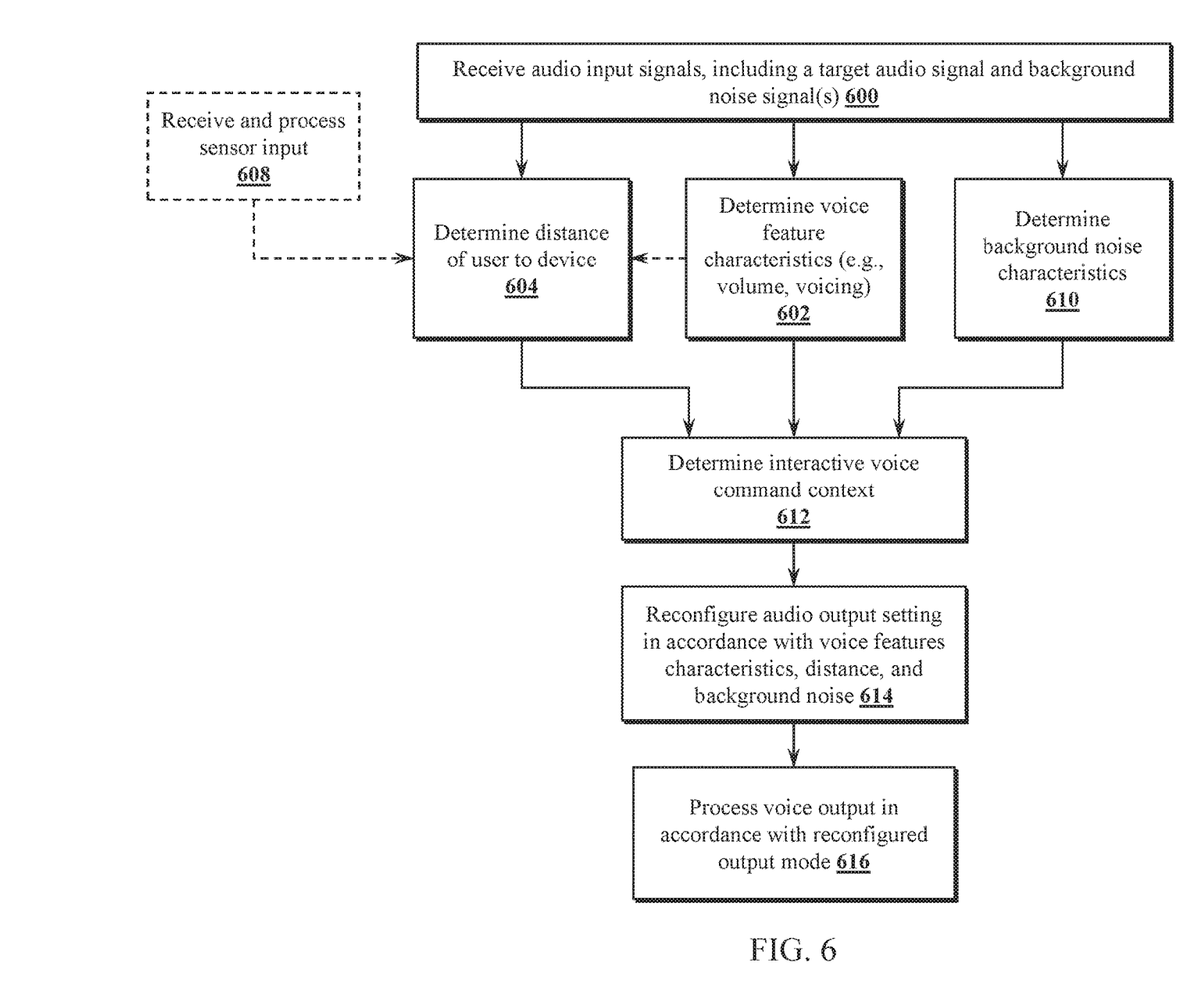
FIG. 6 is a flow chart illustrating an example operation of a context aware voice-interaction device using voice characteristics to modulate audio response, in accordance with one or more embodiments.

Referring to FIG. 6, an example operation of a context aware voice-interaction device using voice characteristics to modulate voice response output, in accordance with one or more embodiments, will now be described. In various embodiments, a voice-interaction device receives audio input signals (step 600) including a target audio signal and background noise. In step 602, voice feature characteristics of the target audio signal are determined. Voice feature characteristics may include an amplitude of the speech in the received target audio signal and a voicing determination. In one embodiment, the voicing determination includes a determination from the voice processor of whether the target speaker is whispering, using a soft voice, using a neutral voice, using a loud voice, or shouting.

In step 604, the audio input signals are evaluated to determine an estimate of the distance between the user and the voice-interaction device. In one embodiment, the distance is estimated using the volume of the received target speech, time difference of arrival of the target speech at two or more microphones of the voice-interaction device, and voicing information (e.g., whispering may indicate the user is in close proximity to the device, while shouting may indicate that the speaker is a greater distance away). In various embodiments, other audio and environmental information may be used, including room characteristics and reverberant signal characteristics. In some embodiments, the voice-interaction device may include additional sensors providing input (step 608) which may be used in the distance determination. For example, as previously discussed herein, an image sensor may be used capture images of a field of view and track a person in the captured images (e.g., using object detection/motion detection) and map the location of the person relative to the voice-interaction device. In step 610, background noise characteristics are determined from the background noise signal(s), which may include determining an average noise level.

In step 612, the voice feature characteristics (from step 602), distance information (from step 604), and background noise characteristics (from step 610), are used by the context-controller to adaptively modify the output mode of the voice-interactive device. For example, in one embodiment, the output audio level is adjusted such that the volume of the voice output as received by the target user is approximately the same level as the target user is speaking. In other embodiments, the output audio level may be adjusted to provide the user with clear voice response that may be independent of the speaker's voice level (e.g., based on environmental noise and distance from the device). In another embodiment, the context-controller uses additional voice characteristics, such how fast the target user is talking, pitch, enunciation, tension to further determine the speaker's emotional state and adjust an output mode accordingly. In step 614, the context-controller reconfigures the audio output setting in accordance with the voice feature characteristics, target user distance and background noise. In step 616, the voice-interactive device processes the voice output in accordance with the reconfigured output mode.

In operation, if a received target audio signal includes whispered speech commands received within a quiet room (e.g., a user's bedroom at night with another person sleeping nearby), the context-controller may adjust the device output volume to deliver voice responses at lower level that matches the input context (a whisper response). In this manner, the present disclosure provides advantages over conventional approaches. If the voice-interactive device were to respond in a standard voice to confirm commands or provide feedback, the volume could be startling and disruptively loud for the use context. While the user can physically adjust the volume by touching the device (e.g., by pressing one or more buttons), this would require extra effort on the part of the user, the user may not be able to reach the device and/or the user may not be aware that a current volume setting is too high until the voice response to delivered.

In another context, the user may be in a noisy environment where it is difficult for the user to hear the response of the device. If the target audio signal includes shouted speech commands received by the device in a noisy environment from a target user who is a distance away from the voice-interactive device (e.g., across a room), the context controller may adjust the device output volume to deliver voice responses at a higher than normal level (e.g., higher than a configured conversational volume level) to project the voice output response over the environmental noise and across the room to the target user. If the user in a noisy environment is detected to be close to the device and speaks in a normal voice or quiet voice, then the context-controller may adaptively adjust the output to match the user's tone, outputting a speech response in a softer voice which will be discernible to the user who is close to the device. If the environment changes (e.g., after a noisy event has ended), the voice-interaction device of the present disclosure will automatically adjust the output volume to a setting appropriate for the new use context, which may be determined using the target user's speech volume, environmental noise level, target user's distance from the device, and other context information.

In one or more embodiments, the voice-interaction device is configured to differentiate between whispered vs. non-whispered speech received from the target user and adaptively adjust the voice output to lower volume settings when whispered speech is detected. For example, the voice-interaction device may classify a target audio signal as comprising "whispered" speech by detecting a low amplitude of the target audio signal, "whisper" vocalization characteristics (e.g., speech duration, energy distribution, spectral slope, harmonic components, and other speech characteristics that differ from normal speech), and context information such as low environmental background noise and a close proximity of the user to the voice-interaction device. In various embodiments, the voice-interaction device may identify a quiet mode that includes a classification of both whispered speech (phonation with no vibration of vocal chords) and soft speech (some vibration of vocal chords) having a lower volume than normal speech. The context controller may analyze the detected use context to determine whether a quiet or whisper mode should be used for audio output.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A voice-interaction device comprising:
   a plurality of input and output components configured to facilitate interaction between the voice-interaction device and a target user, the plurality of input and output components comprising:
      a microphone configured to sense sound and generate an audio input signal;
      a speaker configured to output an audio signal to the target user; and
      input component circuitry configured to sense at least one non-audible interaction from the target user;
   a context controller configured to:
      monitor the plurality of input and output components and
      determine a current use context based on monitoring the plurality of input and output components, wherein determining the current use context comprises estimating a distance between the target user and the voice-interaction device based at least in part on audio originating from the target user and sensed by the microphone of the voice- interaction device;
      facilitate voice communications between the voice-interaction device and the target user; and
      configure one or more of the input and output components in response to the current use context; and
   a display configured to present visual content to the target user;
      wherein the context controller is further configured to adjust a frame rate of video content presented on the display based on the current use context, and wherein adjusting the frame rate comprises decreasing the frame rate of the video content based at least in part on the estimated distance between the target user and the voice-interaction device being greater than a predetermined distance.

2. The voice-interaction device of claim 1, further comprising:
   audio input circuitry configured to receive the audio input signal and generate an enhanced target signal including audio generated by the target user; and
   a voice processor configured to detect a voice command in the enhanced target signal;
   wherein the context controller is further configured to execute the detected voice command in accordance with the current use context.

3. The voice-interaction device of claim 1, wherein the input component circuitry comprises an image sensor configured to capture digital images of a field of view; and
   wherein the context controller is further configured to analyze the digital images to detect and/or track a position of the target user in relation to the voice-interaction device and determine the current use context based at least in part on the position of the target user.

4. The voice-interaction device of claim 3, wherein the context controller is further configured to:
   analyze the digital images to determine a gaze direction of the target user;
   direct interactions to the target user through visual display elements on the display in response to the gaze direction being directed toward the display; and
   direct interactions through the audio output signal and the speaker in response to the gaze direction being directed away from the display.

5. The voice-interaction device of claim 4, wherein the context controller is further configured to adjust a size of the visual display elements based on a movement of the target user relative to the voice-interaction device, wherein the size of the visual display elements is adjusted to facilitate readability at the estimated distance between the target user and the voice-interaction device.

6. The voice-interaction device of claim 3, wherein the input component circuitry comprises a touch control;
   wherein the context controller is further configured to:
      select a proxemic input modality based at least in part on an analysis of the digital images;
      activate the input component circuitry in response to the target user being in reach of the input component circuitry; and
      activate voice communications when the target user is out of reach of the voice-interaction device.

7. The voice-interaction device of claim 1, wherein the context controller is further configured to:
   detect a voice interaction from the target user;
   determine at least one voice characteristic based on the voice interaction; and
   modulate an output volume according to the determined voice characteristic.

8. The voice-interaction device of claim 7, wherein the context controller is further configured to detect:
   a speech volume based at least in part on an amplitude of the input audio signal,
   the at least one voice characteristic, and p1 environmental noise.

9. The voice-interaction device of claim 8, wherein the context controller is further configured to:
   analyze the characteristics of an input audio signal; and
   modulate the output volume of the voice-interaction device to match a detected use context;
      wherein in response to a determination that the input audio signal corresponds to a whisper, the context controller lowers the output volume in the modulating; or
      wherein in response to the target user being located the estimated distance away, the context controller increases the output volume in the modulating to project a voice output to the target user.

10. A method comprising:
    monitoring communications between a voice-interaction device and a target user using a plurality of input and output components of the voice-interaction device, wherein one of the plurality of output components comprises a display configured to present visual content to the target user, and wherein one of the plurality of input components comprises a microphone configured to sense sound;
    determining, by a context controller of the voice-interaction device, a current use context of the voice-interaction device based on the monitored communications of the plurality of input and output components, wherein the determining the current use context comprises estimating a distance between the target user and the voice-interaction device based at least in part on audio originating from the target user and sensed by the microphone of the voice-interaction device; and
    adapting a frame rate of visual content being output through the display based on the current use context, wherein the adapting the frame rate comprises decreasing the frame rate of the visual content based at least in part on the estimated distance between the target user and the voice-interaction device being greater than a predetermined distance.

11. The method of claim 10, wherein the method further comprises:
    sensing sound via the microphone;
    based on the sensed sound, generating an audio input signal;
    generating an enhanced target signal, including audio generated by the target user, from the audio input signal;
    detecting speech in the enhanced target signal;
    extracting a voice command from the detected speech; and
    executing the voice command from the speech in accordance with the current use context.

12. The method of claim 10, further comprising:
    acquiring digital images of a field of view captured by an image sensor of the plurality of input components of the voice-interaction device;
    analyzing the acquired digital images;
    tracking a relative position of the target user in relation to the voice-interaction device based on an analysis of the acquired digital images; and
    determining the current use context based at least in part on the relative position of the target user.

13. The method of claim 12, wherein one of the plurality of output components further comprises a speaker; and wherein the method further comprises:
    analyzing a gaze direction of the target user;
    turning on the display and providing a visual output to the target user in response to the gaze direction being directed toward the display; and
    turning off the display and providing a voice output to the target user through the speaker in response to the gaze direction being directed away from the display.

14. The method of claim 12, further comprising:
    increasing the frame rate of the visual content based at least in part on the target user's estimated distance from the voice-interaction device being less than the predetermined distance.

15. The method of claim 14, further comprising:
    based on the analysis of the acquired digital images:
    activating, by the voice-interaction device, a touch-enabled input component when the target user is in reach of the input component, wherein the activating the touch-enabled input component comprises rendering a user interface button on the display to accept a touch interaction from the target user; and
    activating, by the voice-interaction device, a voice input component and voice output component when the target user is out of reach of the voice-interaction device.

16. The method of claim 10, further comprising:
    adjusting a size of displayed elements on the display as the target user moves relative to the voice-interaction device, wherein the size of the displayed elements is adjusted for readability at the estimated distance between the target user and the voice-interaction device;
    wherein the voice-interaction device activates a touch screen input when the target user is determined to be in arm's reach of a touch-enabled input component of the voice-interaction device.

17. The method of claim 10, further comprising:
    detecting a user voice interaction based on the monitored communications;
    determining at least one voice characteristic based on the user voice interaction; and
    modulating an output volume for one of the plurality of output components based on the determined voice characteristic.

18. The method of claim 17, further comprising:
    detecting a speech volume based at least in part on an amplitude of an input audio signal;
    determining the at least one voice characteristic based on the speech volume;
    detecting environmental noise; and
    further modulating the output volume based on the estimated distance between the target user and the voice-interaction device and the environmental noise.

19. The method of claim 18, further comprising:
    determining that the voice is a whisper based on the at least one voice characteristic; and lowering, by the context controller, the output volume to a corresponding whisper level; and in response to detecting the target user has moved beyond the distance away from the voice-interaction device, increasing, by the context controller, the output volume to project a voice output to the target user.

20. The method of claim 10, further comprising:

detecting that the target user is approaching the voice interaction device;

wherein the adapting the frame rate further comprises incrementally increasing the frame rate as the target user approaches the voice-interaction device.

* * * * *

UNITED STATES PATENT AND TRADEMARK OFFICE
CERTIFICATE OF CORRECTION

PATENT NO. : 11,217,240 B2
APPLICATION NO. : 16/377100
DATED : January 4, 2022
INVENTOR(S) : Jochen Huber, Mohamed Sheik-Nainar and Anna Ostberg It is certified that error appears in the above-identified patent and that said Letters Patent is hereby corrected as shown below:

In the Claims

In Column 13, Line 62, in Claim 1, delete "monitor the plurality of input and output components" and insert -- monitor the plurality of input and output components; --

In Column 14, Line 3, in Claim 1, delete "by the microphone of the voice- interaction device;" and insert -- by the microphone of the voice-interaction device; --

In Column 15, Line 12, in Claim 8, delete "the at least one voice characteristic, and p1 environmental" and insert -- the at least one voice characteristic, and environmental --

In Column 16, Line 67, in Claim 19, delete "least one voice characteristic; and" and insert -- least one voice characteristic; --

Signed and Sealed this
Twenty-first Day of February, 2023

Katherine Kelly Vidal
*Director of the United States Patent and Trademark Office*